US006833205B2

(12) United States Patent
Speranza et al.

(10) Patent No.: US 6,833,205 B2
(45) Date of Patent: Dec. 21, 2004

(54) ELECTROCHEMICAL CELL SYSTEM OUTPUT CONTROL METHOD AND APPARATUS

(75) Inventors: A. John Speranza, West Hartford, CT (US); Lawrence C. Moulthrop, Jr., Windsor, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 362 days.

(21) Appl. No.: 09/909,845

(22) Filed: Jul. 20, 2001

(65) Prior Publication Data

US 2002/0020623 A1 Feb. 21, 2002

Related U.S. Application Data

(60) Provisional application No. 60/219,528, filed on Jul. 20, 2000.

(51) Int. Cl.[7] .......................... H01M 8/00; H01M 8/18; H01M 21/02; G01N 27/00; G05B 21/00
(52) U.S. Cl. .............................. 429/13; 429/12; 429/20; 429/25; 429/34; 422/50; 422/62; 422/83; 422/98; 436/149; 204/193; 204/194; 204/288.4; 204/288.6; 204/229.8; 204/230.2; 700/266
(58) Field of Search .................. 422/50, 62, 83, 422/98; 436/149; 429/12, 13, 20, 25, 34; 204/193, 194, 228.4, 228.6, 229.8, 230.2; 700/266

(56) References Cited

U.S. PATENT DOCUMENTS

| 4,362,788 A | 12/1982 | Maru et al. ................... 429/13 |
|---|---|---|
| 4,365,007 A | 12/1982 | Maru et al. ................... 429/19 |
| 5,037,518 A * | 8/1991 | Young et al. ............ 204/228.5 |
| 5,434,016 A | 7/1995 | Benz et al. ................... 429/13 |
| 5,645,950 A | 7/1997 | Benz et al. ................... 429/13 |
| 5,763,113 A * | 6/1998 | Meltser et al. ................ 429/13 |
| 5,780,981 A | 7/1998 | Sonntag et al. ............. 318/139 |
| 5,794,732 A | 8/1998 | Lorenz et al. ............. 180/65.3 |
| 5,980,726 A | 11/1999 | Moulthrop, Jr. et al. .... 205/637 |
| 5,985,474 A | 11/1999 | Chen et al. ................... 429/17 |
| 6,051,192 A | 4/2000 | Maston et al. .............. 422/110 |
| 6,083,637 A | 7/2000 | Walz et al. ................... 429/17 |
| 6,093,502 A | 7/2000 | Carlstrom, Jr. et al. ....... 429/25 |
| 6,103,409 A * | 8/2000 | DiPierno Bosco et al. ... 429/13 |
| 6,303,009 B1 * | 10/2001 | Bossard ................... 204/228.4 |
| 6,383,670 B1 * | 5/2002 | Edlund et al. ................ 429/20 |
| 6,413,662 B1 * | 7/2002 | Clingerman et al. .......... 429/25 |
| 6,423,434 B1 * | 7/2002 | Pratt et al. .................... 429/13 |
| 6,503,651 B1 * | 1/2003 | Nguyen ....................... 429/34 |

FOREIGN PATENT DOCUMENTS

| EP | 0827226 A2 | 3/1998 |
|---|---|---|
| EP | 0862233 A2 | 9/1998 |
| EP | 0948069 A2 | 10/1999 |
| FR | 2712099 | 5/1995 |

OTHER PUBLICATIONS

International Search Report dated Dec. 27, 2002.
JP59075572. Publication date Apr. 28, 1984. Abstract only 1 page.

* cited by examiner

*Primary Examiner*—Jill Warden
*Assistant Examiner*—Brian J. Sines
(74) *Attorney, Agent, or Firm*—Cantor Colburn LLP

(57) ABSTRACT

A method and apparatus is provided for an electrochemical cell system. The electrochemical cell system includes: an electrochemical cell; an energy source configured for providing a quantity of energy to the electrochemical cell; a sensing apparatus in operable communication with a gas output from the electrochemical cell, the sensing apparatus provides an output signal indicating a parameter of the gas output; and a computer in operable communication with the sensing apparatus. The computer includes a memory device configured to store a first operational parameter, and a processor configured to receive a digital representation of the output signal and the first operational parameter. The processor compares the digital representation of the output signal to the first operational parameter for regulating the quantity of energy provided to the electrochemical cell.

26 Claims, 6 Drawing Sheets

ELECTROCHEMICAL CELL SYSTEM OUTPUT CONTROL METHOD AND APPARATUS

CROSS REFERENCE TO RELATED APPLICATION

This application claims the benefit under Title 35, United States Code, §119(e) to U.S. provisional application No. 60/219,528, filed on Jul. 20, 2000, which is incorporated by reference herein in its entirety.

BACKGROUND

Electrochemical cells are energy conversion devices, usually classified as either electrolysis cells or fuel cells. A proton exchange membrane cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of an exemplary embodiment of an anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exit cell 100, while protons 106 and water 110 migrate across a proton exchange membrane 118 to cathode 114 where hydrogen gas 112 is formed.

Another exemplary embodiment of a water electrolysis cell using a configuration similar to the one shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A fuel cell also uses a configuration similar to the one shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catalyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water. The electrical potential across the anode and the cathode can be exploited to power an external load.

In other exemplary embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems generally include a number of individual cells arranged in a stack, with the working fluids directed through the cells via input and output conduits formed within the stack structure. The cells within the stack are sequentially arranged, each including a cathode, a proton exchange membrane, and an anode. Each cathode/membrane/anode assembly (hereinafter "membrane electrode assembly," or "MEA") comprises a first flow field in fluid communication with the cathode and a second flow field in fluid communication with the anode. The MEA may furthermore be supported on both sides by any one of a variety of different structures disposed within flow fields defined by the particular architecture of the cell, such as screen packs or bipolar plates. These may further facilitate fluid movement to and from the MEA, as well as membrane hydration.

In an electrochemical cell system, the output pressure of the hydrogen gas can be used to control the generation rate of the cell. In such a system, a pressure transducer monitors hydrogen pressure downstream of the cell and produces a corresponding electrical signal, which is provided to analog control circuitry to control the electrical power supplied to the electrolytic cell. The analog control circuitry includes a manually-adjusted potentiometer that allows manual setting of a reference voltage corresponding to an output value (e.g., pressure). The electrical signal is compared by a comparator circuit to the reference voltage. The output of the comparator circuit is provided to a pulse width modulator that, in turn, controls a silicon controlled rectifier type power supply for the electrolytic cell. One drawback of such a manual controller is the lack of remote control of the reference voltage. Another drawback is the lack of direct integration with a feedback system.

While existing electrochemical cell system output controllers are suitable for their intended purposes, there still remains a need for improvements, particularly related to ease of use, ease of control, and feedback integration.

SUMMARY OF THE INVENTION

The above-described drawbacks and deficiencies of the prior art are overcome or alleviated by an electrochemical cell system comprising: an electrochemical cell, an energy source configured for providing a quantity of energy to the electrochemical cell; a sensing apparatus in operable communication with a gas output from the electrochemical cell, the sensing apparatus provides an output signal indicating a parameter of the gas output; and a computer in operable communication with the sensing apparatus. The computer includes a memory device configured to store a first operational parameter, and a processor configured to receive a digital representation of the output signal and the first operational parameter. The processor compares the digital representation of the output signal to the first operational parameter for regulating the quantity of energy provided to the electrochemical cell.

A method for controlling a gas output from an electrochemical cell electrically connected to an electrical source includes: sensing a parameter of the gas output to create a sensed signal indicating the parameter; retrieving a predetermined value and a predetermined variance from a memory device; comparing the sensed signal to the predetermined value; providing a signal to the electrical source when the sensed signal differs from the predetermined value by an amount greater than the predetermined variance; and adjusting an output of the electrical source in response to the signal.

In an alternative embodiment, a method of controlling a gas output from an electrochemical cell electrically connected to an electrical source includes: sensing a parameter of the gas output to create a sensed signal indicating the parameter; retrieving a predetermined upper value from a memory device; comparing the sensed signal to the predetermined upper value; providing a lower signal to the electrical source when the sensed signal is greater than the predetermined upper value; and lowering an output of the electrical source in response to the lower signal.

In another alternative embodiment, a method of controlling a gas output from an electrochemical cell electrically connected to an electrical source includes: sensing a parameter of the gas output to create a sensed signal indicating the parameter; retrieving a predetermined value from a memory device, the predetermined value indicates an expected increase in the parameter over a period of time; monitoring the sensed signal over the period of time to determine an increase in the parameter; providing a signal to one or more of an alarm and the electrical source when the increase in the parameter is less than the expected increase in the parameter.

These and other features and advantages of the present invention will be appreciated and understood by those skilled in the art from the following detailed description and drawings.

BRIEF DESCRIPTION OF THE DRAWINGS

Referring now to the drawings, which are meant to be exemplary not limiting, and wherein like elements are numbered alike in the several FIGURES.

DETAILED DESCRIPTION

Figure 2:
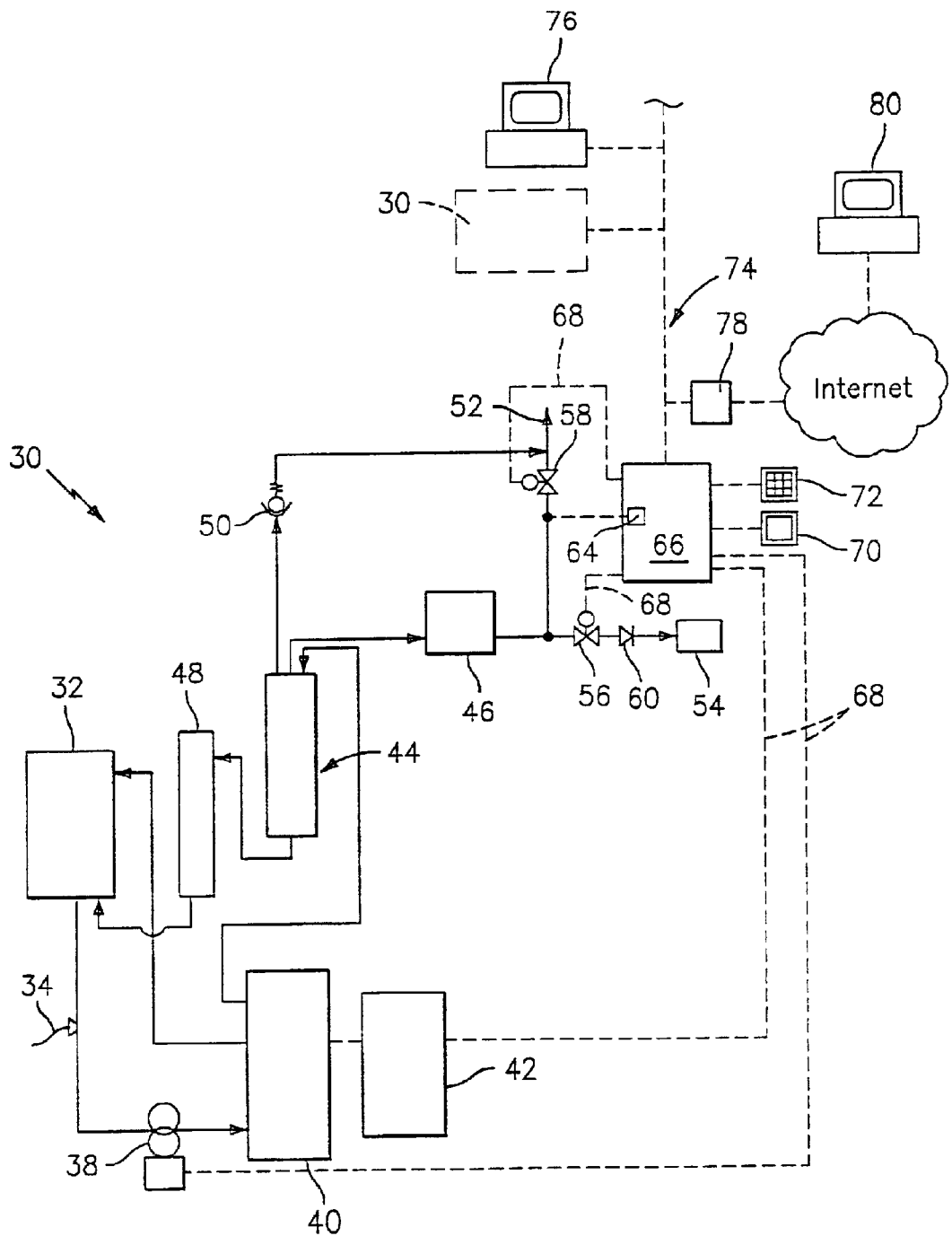
FIG. 2 is a schematic diagram of an electrochemical cell system including a computer.

Referring to FIG. 2, an exemplary embodiment of an electrochemical cell system is shown generally at 30 and is hereinafter referred to as "system 30." System 30 is suitable for generating hydrogen for use in gas chromatography, as a fuel, and for various other applications. It is to be understood that while the inventive improvements described below are described in relation to an electrolysis cell, the improvements are generally applicable to both electrolysis and fuel cells. Furthermore, although the description and figures are directed to the production of hydrogen and oxygen gas by the electrolysis of water, the apparatus is applicable to the generation of other gases from other reactant materials.

Figure 1:
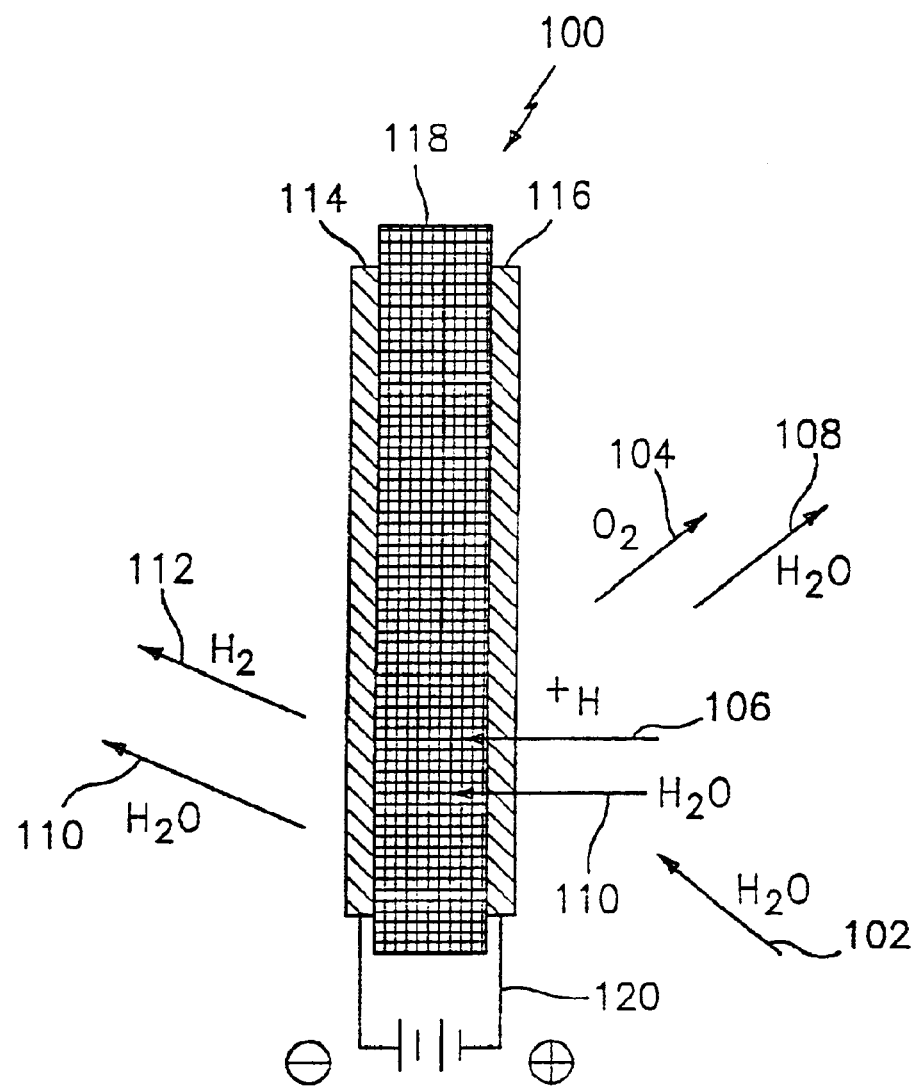
FIG. 1 is a schematic diagram of a prior art electrochemical cell showing an electrochemical reaction.

Exemplary system 30 includes a water-fed electrolysis cell, as shown in FIG. 1, capable of generating gas from reactant water and is operatively coupled to a control system. Suitable reactant water is deionized, distilled water, which is continuously supplied from a water source 32. The reactant water utilized by system 30 is stored in water source 32 and is fed by gravity or pumped through a pump 38 into an electrolysis cell stack 40. The supply line, which is preferably clear plasticizer-free tubing, includes an electrical conductivity sensor 34 disposed therewithin to monitor the electrical potential of the water, thereby determining its purity and ensuring its adequacy for use in system 30.

Cell stack 40 comprises a plurality of cells similar to cell 100 described above with reference to FIG. 1 encapsulated within sealed structures (not shown). The reactant water is received by manifolds or other types of conduits (not shown) that are in fluid communication with the cell components. An electrical source 42 is disposed in electrical communication with each cell within cell stack 40 to provide a driving force for the dissociation of the water.

Oxygen and water exit cell stack 40 via a common stream and are ultimately returned to water source 32, whereby the water is recycled and the oxygen is vented to the atmosphere. The hydrogen stream, which contains water, exits cell stack 40 and is fed to a phase separation tank, which is a hydrogen/water separation apparatus 44, hereinafter referred to as "separator 44" where the gas and liquid phases are separated. This hydrogen stream has a pressure that is preferably about 250 pounds per square inch (psi), but which may be anywhere from about 1 psi to about 6000 psi. Some water is removed from the hydrogen stream at separator 44. The exiting hydrogen gas (having a lower water content than the hydrogen stream to separator 44) is further dried at a drying unit 46, which may be, for example, a diffuser, a pressure swing absorber, or desiccant. Water with trace amounts of hydrogen entrained therein is returned to water source 32 through a low pressure hydrogen separator 48. Low pressure hydrogen separator 48 allows hydrogen to escape from the water stream due to the reduced pressure, and also recycles water to water source 32 at a lower pressure than the water exiting separator 44. Separator 44 also includes a release 50, which may be a relief valve, to rapidly purge hydrogen to a hydrogen vent 52 when the pressure or pressure differential exceeds a preselected limit.

Hydrogen from diffuser 46 is fed to a hydrogen storage 54. Valves 56, 58 are provided at various points on the system lines and are configured to release hydrogen either to vent 52 or to hydrogen storage 54 under certain conditions. Furthermore, a check valve 60 is provided that prevents the backflow of hydrogen from hydrogen storage 54 to diffuser 46 and separator 44.

An output sensor 64 is incorporated into system 30 to sense a parameter of the hydrogen gas at a point downstream of drying unit 46. Output sensor 64 may be a pressure transducer that converts gas pressure within the hydrogen line to a voltage or current level indicative of the gas pressure. Output sensor 64 may also be any other sensor suitable for sensing a qualitative or quantitative parameter of the gas and providing an electrical signal indicative of that parameter as output. Such other sensors include, but are not limited to, a flow rate sensor, a mass flow sensor, and a differential pressure sensor.

Output sensor 64 interfaces with a computer 66. Computer 66 is a suitable electronic device capable of accepting data and instructions, executing the instructions to process the data, and presenting the results. Therefore, computer 66 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing.

Computer 66 is capable of converting the analog voltage or current level provided by sensor 64 into a digital signal indicative of the sensed hydrogen pressure, referred to hereinafter as $P_{act}$. Alternatively, sensor 64 may be configured to provide a digital signal to computer 66, or an analog-to-digital (A/D) converter (not shown) maybe coupled between sensor 64 and computer 66 to convert the analog signal provided by sensor 64 into a digital signal for processing by computer 66. Computer 66 uses the digital signal $P_{act}$ as input to various processes for controlling the output of system 30, as will be described in further detail hereinafter.

Computer 66 is operably coupled with one or more components of system 30 by data transmission media 68. Data transmission media 68 includes, but is not limited to, twisted pair wiring, coaxial cable, and fiber optic cable. Data transmission media 68 also includes, but is not limited to, radio and infrared signal transmission systems. In the embodiment shown in FIG. 2, transmission media 68 couples computer 66 to electrical source 42, pump 38, and valves 56 and 58. Computer 66 is configured to provide operating signals to these components and to receive data from these components via data transmission media 68.

In general, computer 66 accepts data from output sensor 64, is given certain instructions for the purpose of comparing the data from output sensor 64 to predetermined set points, and acts on electrical source 42 to increase or decrease the voltage across electrodes in electrolysis cell stack 40, thereby increasing or decreasing the output of electrolysis cell stack 40. Computer 66 provides operating signals to valves 56 and 58 to effectuate automatic shutoff of gas to hydrogen storage 54 and/or to divert the flow of gas to vent 52. Computer 66 also accepts data from valves 56 and 58, indicating, for example, whether the valves 56 and 58 are open or closed. In addition, computer 66 accepts data from pump 38, indicating, for example, whether pump 38 is running and the speed at which it is running. The data received from output sensor 64, valves 56 and 58, and pump 38 may be displayed on a monitor 70, which is coupled to computer 66. Monitor 70 is an LED (light-emitting diode) display, an LCD (liquid-crystal diode) display, a CRT (cathode ray tube) display, or the like. A keypad 72 is coupled to computer 66 for providing data input to computer 66.

In addition to being coupled to one or more components within system 30, computer 66 may also be coupled to external computer networks such as a local area network (LAN) 74 and the Internet. LAN 74 interconnects one or more remote computers 76, which are configured to communicate with computer 66 using a well-known computer communications protocol such as TCP/IP (Transmission Control Protocol/Internet Protocol), RS-232, ModBus, and the like. Additional systems 30 may also be connected to LAN 74 with the computers 66 in each of these systems 30 being configured to send and receive data to and from remote computers 76 and other systems 30. LAN 74 is connected to the Internet via a server computer 78. This connection allows computer 66 to communicate with one or more remote computers 80 connected to the Internet.

Figure 3:
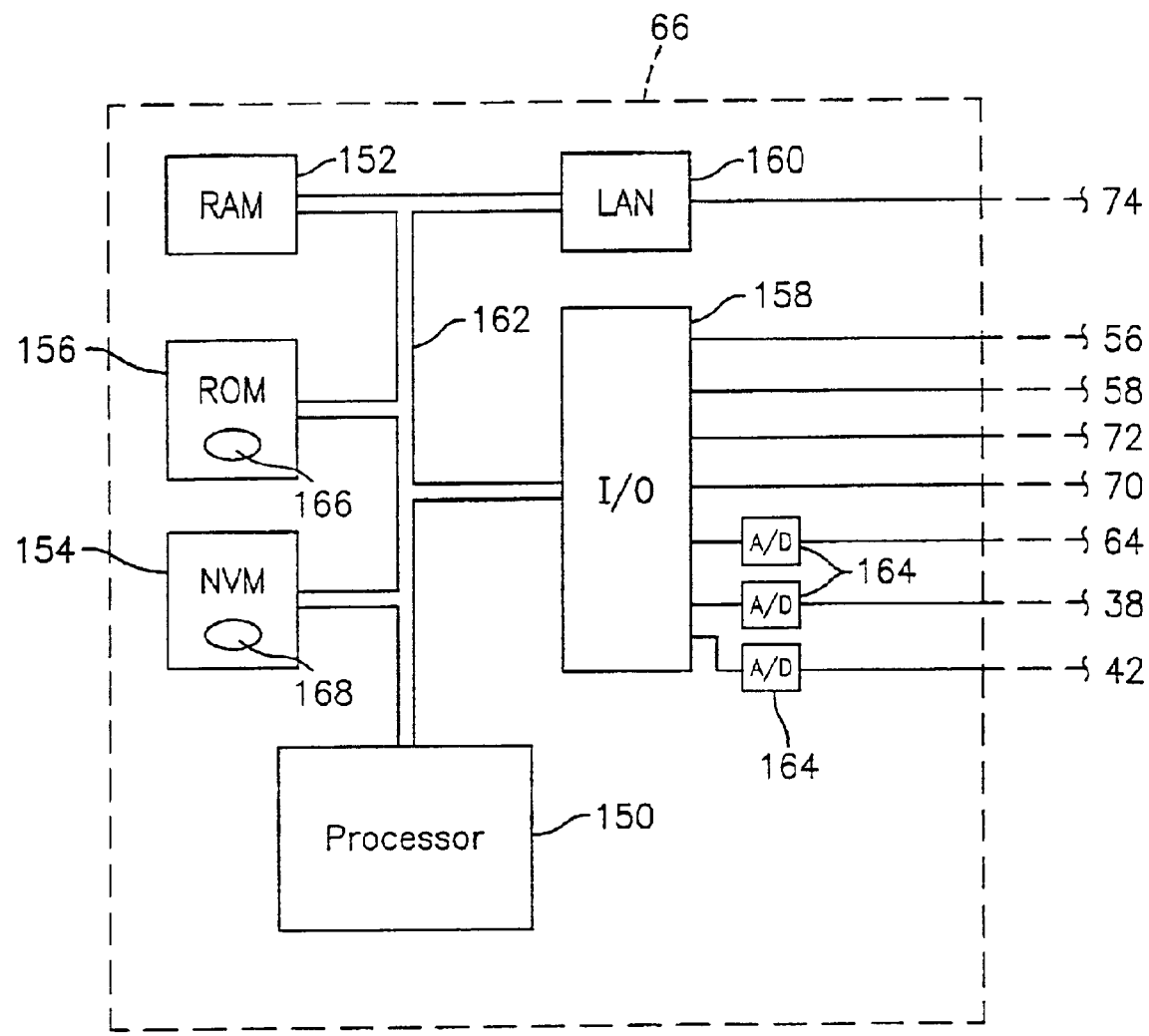
FIG. 3 is a schematic diagram of the computer of FIG. 2.

Referring now to FIG. 3, a schematic diagram of computer 66 is shown. Computer 66 includes a processor 150 coupled to a random access memory (RAM) device 152, a non-volatile memory (NVM) device 154, a read-only memory (ROM) device 156, one or more input/output (I/O) controllers 158, and a LAN interface device 160 via a data communications bus 162.

I/O controllers 158 are coupled to valves 56 and 58, keypad 72, and monitor 70 for providing digital data between these devices and bus 162. I/O controllers 158 are also coupled to analog-to-digital (A/D) converters 164, which receive analog data signals from output sensor 64, and pump 34. One A/D converter 164 is coupled to a power control circuit (not shown) in power source 42. Processor 150 provides control signals (e.g., pulse-width modulated control signals) to the power control circuit in power source 42 via I/O controllers 158 and A/D converter 164. In response to the control signals provided by processor 150, power source 42 provides a corresponding level of voltage across the electrodes in electrolysis cell stack 40. The power control circuit in power source 42 may include, for example, a silicon controlled rectifier (SCR) based power control circuit.

LAN interface device 160 provides for communication between computer 66 and LAN 74 in a data communications protocol supported by LAN 74. ROM device 156 stores an application code 166, e.g., main functionality firmware, including initializing parameters, and boot code, for processor 150. Application code 166 also includes program instructions for causing processor 150 to execute electrochemical cell system output control methods, as will be described in further detail with reference to FIGS. 4–6.

NVM device 154 is any form of non-volatile memory such as an EPROM (Erasable Programmable Read Only Memory) chip, a disk drive, or the like. Stored in NVM device 154 are various operational parameters 168 for the application code 166, which will be described in further detail with reference to FIGS. 4–6. The various operational parameters 168 can be input to NVM device 154 either locally, using keypad 72 or remote computer 76 (FIG. 2), or remotely via the Internet using remote computer 80 (FIG. 2). It will be recognized that application code 166 can be stored in NVM device 154 rather than ROM device 156.

Figure 4:
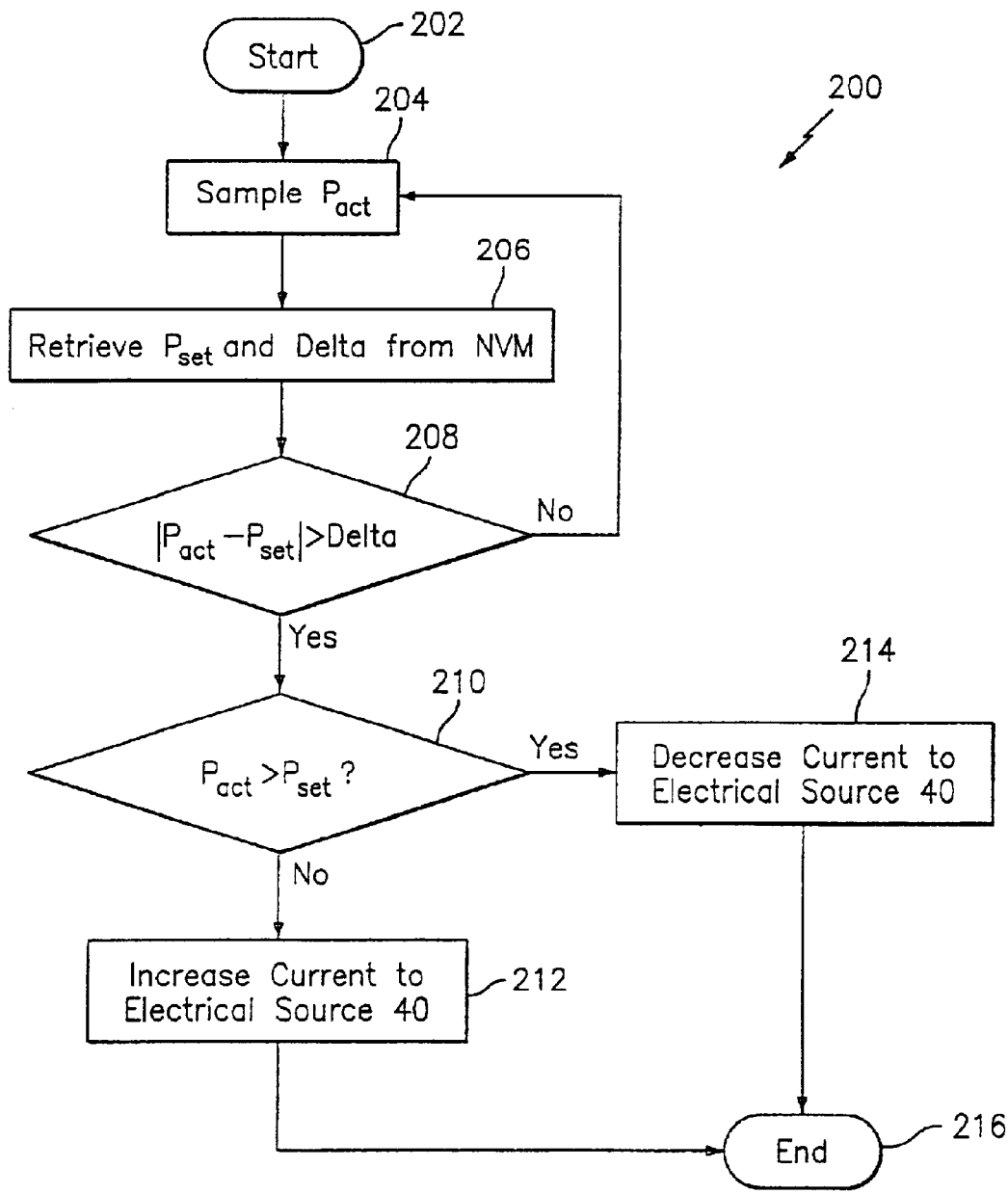
FIG. 4 is a flow diagram of an electrochemical cell system output control method employed by the computer of FIG. 3.
Figure 5:
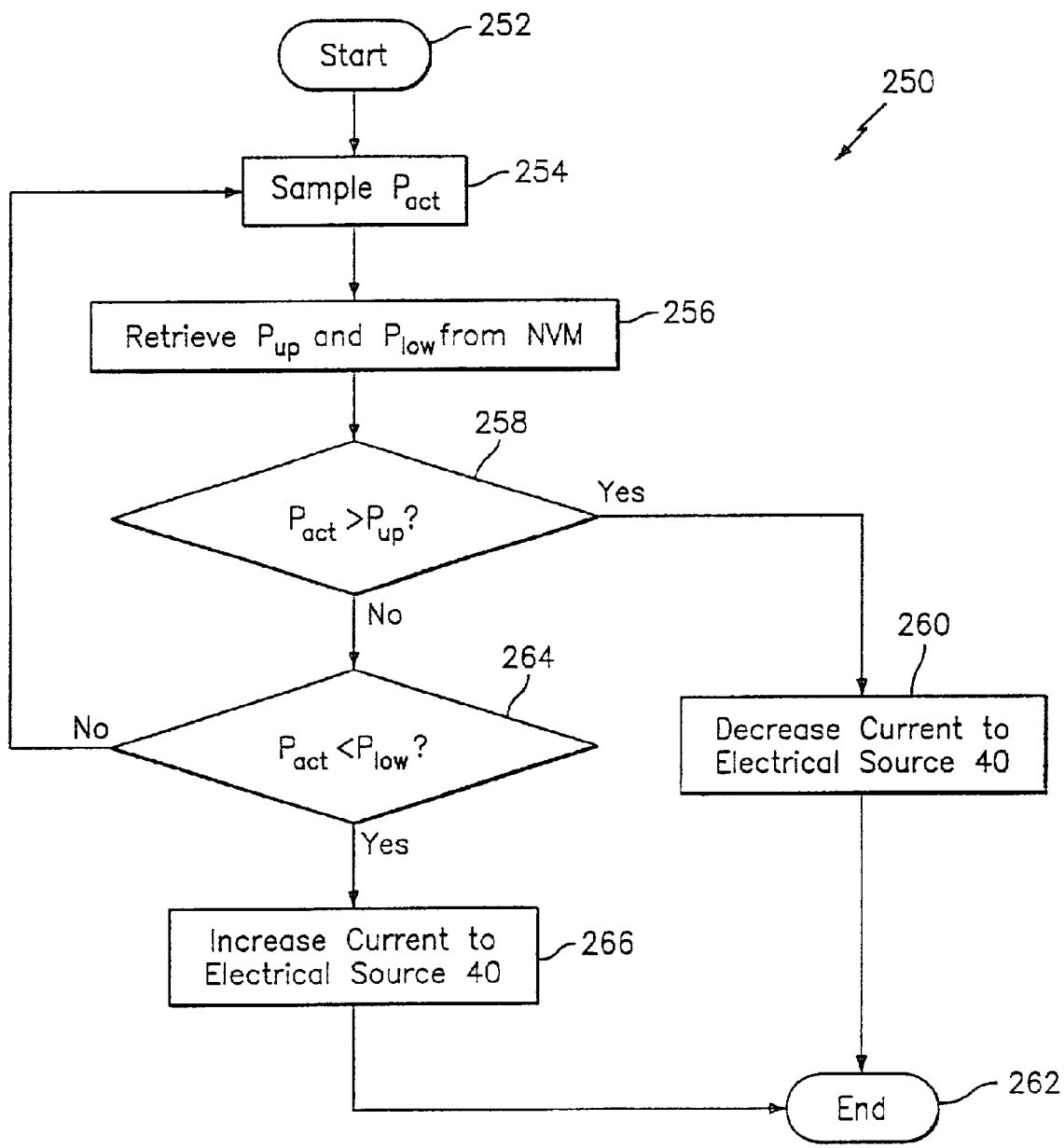
FIG. 5 is a flow diagram of an alternative embodiment of the electrochemical cell system output control method of FIG. 4.
Figure 6:
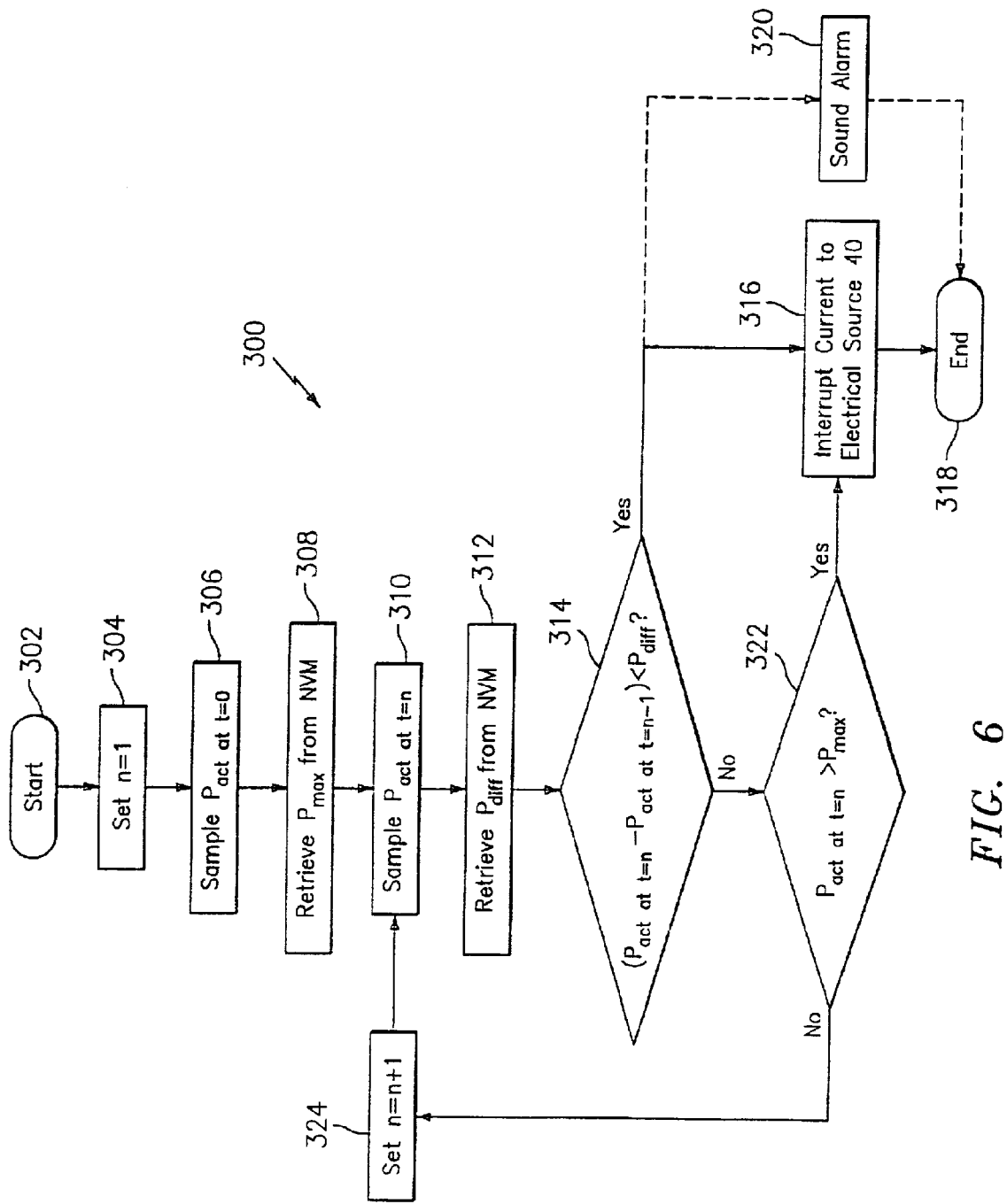
FIG. 6 is a flow diagram of an electrochemical cell system output control method employed by the computer of FIG. 3.

FIGS. 4, 5, and 6 are flow diagrams depicting the electrochemical cell system output control methods included in application code 166. These methods are embodied in computer instructions written to be executed by processor 150, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In the embodiment described with reference to FIG. 3, the methods of FIGS. 4, 5, and 6 are stored in ROM device 156 as computer instructions written in assembly language and, preferably, in a platform provided by Microchip® in Chandler, Ariz.

Referring to FIGS. 2, 3, and 4, an electrochemical cell system output control method 200 of FIG. 4 will now be described. Method 200 starts at block 202 and proceeds to block 204. At block 204, the digital signal $P_{act}$, which is indicative of the sensed hydrogen pressure downstream of diffuser 46, is sampled. Method 200 then proceeds to block 206, where the operational parameters "$P_{set}$" and "Delta" are retrieved from NVM device 154. The operational parameter $P_{set}$ represents a desired hydrogen output pressure. Typical values for $P_{set}$ are between about 0 pounds per square inch (p.s.i.) and 2500 p.s.i., and preferably between 65 p.s.i. and 250 p.s.i. The operational parameter Delta represents a pressure deviance limit relative to $P_{set}$. Typical values for Delta are between about 1 p.s.i. and 50 p.s.i., and preferably between about 5 p.s.i. and 25 p.s.i. $P_{set}$ and Delta will generally vary depending on factors including but not limited to the type of hydrogen in use or the storage capacity of storage 54.

Method 200 continues from block 206 to block 208. At block 208, the value $P_{act}$ from block 204, and the values $P_{set}$ and Delta from block 206, are introduced into the following query at a block 208:

Is $|P_{act}-P_{set}|$>Delta?

If the answer to the query of block 208 is negative, then the actual pressure $P_{act}$ is within the allowable variance Delta as compared to the set point pressure $P_{set}$, and method 200 returns to block 204 where the signal $P_{act}$ is again sampled. This loop continues generally until method 200 is externally terminated or paused, or until the query of block 208 is answered affirmatively.

If the answer to the query of block 208 is affirmative, either in the first instance or after one or more negative answers, method 200 proceeds to a block 210, wherein the flowing query is presented:

Is $P_{act}$>$P_{set}$?

Generally, this query determines the type of control signal to provide to electrical source 42. Specifically, the query of block 210 determines whether to increase or decrease the current provided to cell stack 40 by electrical source 42. If the query is answered negatively, indicating insufficient hydrogen pressure, method 200 continues to block 212 where processor 150 is instructed to provide an increase signal to the electrical source 42. In response to receiving the increase signal, electrical source 42 increases current to the cell stack 40. An increase in the current to the cell stack 40 will cause an increase in the reaction rate, thereby causing an increase in the pressure in the hydrogen output line. The raise signal may include, for example, a gate control signal such as adjusting the pulse width of the signal output to electrical source 42. If the query at block 210 is answered affirmatively, indicating excessive hydrogen pressure, method 200 continues to block 214 where processor 150 is instructed to provide a decrease signal to the electrical source 42. In response to receiving the decrease signal, electrical source 42 decreases current to the cell stack 40. A decrease in the current to cell stack 40 will cause a decrease in the reaction rate, thereby causing a decrease in the pressure in the hydrogen line. The decrease signal may include, for example, a gate control signal such as adjusting the pulse width of the signal output to electrical source 42. Method 200 ends at block 216 after either block 212 or 214. It will be recognized that method 200 is performed repetitively by processor 150 during the operation of system 30.

Referring to FIGS. 2, 3, and 5, an alternative electrochemical cell system output control method 250 of FIG. 5 will now be described. After starting at block 252, method 250 proceeds to block 254, where the digital signal $P_{act}$, which is indicative of the sensed hydrogen pressure downstream of diffuser 46, is sampled. Method 250 then proceeds to block 256, where the operational parameters "$P_{up}$" and "$P_{low}$" are retrieved from NVM device 154. The operational parameter $P_{up}$ represents an upper limit set point for hydrogen output pressure, and the operational parameter $P_{low}$ represents a lower limit set point for hydrogen output pressure. $P_{up}$ and $P_{low}$ will generally vary depending on factors including but not limited to the type of hydrogen used or the capacity of hydrogen storage 54.

From block 256, method 250 proceeds to block 258 where the value $P_{act}$ from block 254 and the value $P_{up}$ from block 256 are introduced into the following query:

Is $P_{act}$>$P_{up}$?

If the answer to the query of block 258 is affirmative, indicating excessive hydrogen output pressure, then method 250 proceeds to block 260 where the processor 150 is instructed to provide an decrease signal to the electrical source 42. In response to receiving the decrease signal, electrical source 42 decreases current to the cell stack 40. After block 260, method 250 ends at block 262.

If the answer to the query of block 258 is negative, then the actual pressure $P_{act}$ is less than or equal to the upper limit set point hydrogen output pressure $P_{up}$ and method 250 proceeds to block 264 where $P_{act}$ and $P_{low}$ are introduced into the following query:

Is $P_{act}$<$P_{low}$?

If the answer to the query of block 264 is affirmative, indicating insufficient hydrogen output pressure, then method 250 proceeds to block 266, where the processor 150 is instructed to provide an increase signal to the electrical source 42. In response to receiving the increase signal, electrical source 42 increases current to the cell stack 40. After block 266, method 250 ends at block 262. It will be recognized that method 250 is performed repetitively by processor 150 during the operation of system 30.

If the answer to the query of block 264 is negative, then the actual pressure $P_{act}$ is between the lower limit set point hydrogen output pressure $P_{low}$ and the upper limit set point hydrogen output pressure $P_{up}$, and the method 250 loops back to block 254 where the digital signal $P_{act}$ is again sampled. This loop continues generally until method 250 is externally terminated or paused, or until either the query of block 258 or the query of block 264 is answered affirmatively.

Referring to FIGS. 2, 3, and 6, an electrochemical cell system output control method 300 of FIG. 6 will now be described. Method 300 causes the electrical current to cell 38 to be interrupted in the event of extreme pressure build up that could damage equipment or in the event that the generation rate of system 30 falls below some predetermined amount due to, for example, a leak in system 30. Method 300 can be implemented concurrently with previously described methods 200 or 250.

Method 300 starts a block 302 and proceeds to block 304 where a time step counter "n" is set to an initial value (e.g., 1). Method 300 proceeds to block 306 where the digital signal $P_{act}$, which is indicative of the sensed hydrogen pressure downstream of diffuser 46, is sampled at an initial time "t=0". Method 300 then proceeds to block 308, where the operational parameter "$P_{max}$" is retrieved from NVM device 154. The operational parameter $P_{max}$ represents a safety set point that will prevent, for example, an extreme pressure build up that could damage equipment. For example, $P_{max}$ can be set between about 10 p.s.i. and about 50 p.s.i. above the normal operating pressure (e.g., $P_{set}$), but actual values may vary depending on system needs.

From block 308, method 300 continues to block 310, where the digital signal $P_{act}$ is sampled at a time "t=n". Method 300 then continues to block 312, where the operational parameter "$P_{diff}$" is retrieved from NVM device 154. The operational parameter $P_{diff}$ represents an expected increase in hydrogen output pressure over the duration of each time step "n" (e.g., between t=0 and t=1). $P_{diff}$ is selected based on some percentage (e.g., 90%) of the expected generation rate of cell stack 40 for a given current provided to cell stack 40 by electrical source 42. Where the output of electrical source 42 is variable, as in methods 200 and 250, application code 166 instructs processor 150 to periodically determine $P_{diff}$ based on the electrical current output to cell stack 40 by electrical source 42. Processor 150 accomplishes this by accessing one or more lookup tables or an equation correlating $P_{diff}$ to the electrical current output by electrical source 42.

From block 312, method 300 proceeds to block 314 where the parameter $P_{diff}$ and the values $P_{act}$ for the current time step (t=n) and for the previous time step (t=n−1) are introduced into the following query:

Is $(P_{act\ at\ t=n} - P_{act\ at\ t=n-1}) < P_{diff}$?

If the answer to the query of block 314 is affirmative, indicating that the generation rate of system 30 has fallen below some predetermined value, method 300 proceeds to block 316 where processor 150 is instructed to provide an interrupt signal to electrical source 42. In response to receiving said interrupt signal, electrical source 42 interrupts the flow of current to cell stack 40. The interrupt signal may include, for example, a gate control signal such as adjusting the pulse width of the signal output to electrical source 42. After block 316, method 300 ends at block 318. Alternatively, if the answer to the query of block 314 is affirmative, method 300 proceeds to block 320 where an alarm is activated (e.g., sounded) to warn operations personnel.

If the answer to the query of block 314 is negative, indicating that the generation rate of system 30 is sufficient, method 300 proceeds to block 322 where the parameter $P_{max}$ and the value $P_{act}$ for the current time step (t=n) are introduced into the following query:

Is $P_{act\ at\ t=n} > P_{max}$?

If the answer to the query of block 322 is affirmative, indicating that the actual pressure $P_{act}$ exceeds the prescribed maximum pressure $P_{max}$, process 300 proceeds to block 316 where processor 150 is instructed to provide an interrupt signal to electrical source 42. After block 316, method 300 ends at block 318.

If the answer to the query of block 322 is negative, process 300 proceeds to block 324 where the time step is incremented, and then to block 310 where the digital signal $P_{act}$ is sampled for the new time step. This loop continues generally until method 300 is externally terminated or paused, or until the query of block 314 or block 322 is answered affirmatively.

In further alternative embodiments, feedback from electrical source 42 and/or cell stack 40 can be provided to computer 66. Computer 66 uses information related to the current supplied by electrical source 42, the voltage across electrical source 42, and/or voltages across particular portions of cell 38, and/or voltages across particular portions of cell stack 40 to update the various operational parameters 168. Further, all or some of this information can be presented to operations personnel on monitor 70. Additionally, all or some of this information can be stored in NVM device 168 and later retrieved for, among other things, updating operational parameters 168, monitoring the health of system 30, or for predicting $P_{diff}$ for various electrical source 42 output levels.

The electrochemical cell system output control method and apparatus described herein allows operational parameters for the system to be set either remotely or locally. Because the operational parameters can be set remotely, a single operator can monitor and control any number of electrochemical control systems from virtually any location. The remote setting of operational parameters provides an operational convenience that was previously unattainable with electrochemical cell system output controllers of the prior art, which require operational parameters to be set locally. In addition, the present invention provides manpower and cost savings over the prior art because a single operator can monitor and operate any number of systems located at different sites. Prior art systems require an operator to be present on-site to monitor and control the electrochemical cell systems.

The electrochemical cell system output control method and apparatus described herein also allows operational parameters to be automatically updated based on system feedback. For example, the operational parameter $P_{diff}$, which is used for monitoring generation rate, can be updated to correspond to the power supplied to the cell stack. In electrochemical cell systems of the prior art, such feedback would be performed manually, making the implementation of certain methods, such as the method 300 described herein for monitoring generation rate, impossible.

The electrochemical cell system output control methods can be embodied in the form of computer-implemented processes and apparatuses for practicing those processes. The electrochemical cell system output control methods can also be embodied in the form of computer program code containing instructions, embodied in tangible media, such as floppy diskettes, CD-ROMs, hard drives, or any other computer-readable storage medium, wherein, when the computer program code loaded into and executed by a computer, the computer becomes an apparatus for practicing the invention. The electrochemical cell system output control methods can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When the implementation is on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical cell system comprising:

an electrochemical cell;

an electrical source configured for providing a quantity of electrical energy to said electrochemical cell;

a sensing apparatus in operable communication with a gas output from said electrochemical cell, said sensing apparatus adapted to provide a first signal indicative of a parameter of said gas output; and a computer in operable communication with said sensing apparatus and said electrical source, said computer including:
a processor programmed for
retrieving a first operational parameter and a predetermined variance from a memory device;
comparing said first signal to said first operational parameter;
providing a third signal to said electrical source in response to said first signal differing from said first operational parameter by an amount greater than said predetermined variance;
adjusting an output of said electrical source in response to said third signal;
adjusting at least one of said predetermined value and said predetermined variance based on feedback from said electrical source;
wherein said processor and a non-volatile memory device are operably coupled to a remote computer, said remote computer is configured to provide said first operational parameter to said non-volatile memory device.

2. The electrochemical cell system of claim 1, wherein said processor is adapted to determine said first operational parameter based on feedback from said energy source.

3. The electrochemical cell system of claim 1, wherein said parameter of said gas output is a pressure of said gas output.

4. The electrochemical cell system of claim 3, wherein said first operational parameter is indicative of a desired gas output pressure, said memory device is further configured to store a second operational parameter, said second operational parameter is indicative of a pressure variance limit relative to said desired gas output pressure; and
wherein said processor is adapted to provide an increase-signal to said energy source in response to said pressure of said gas output being less than said desired gas output pressure by an amount greater than said pressure variance limit.

5. The electrochemical cell system of claim 4, wherein said processor is adapted to provide a decrease-signal to said energy source in response to said pressure of said gas output exceeding said desired gas output pressure by an amount greater than said pressure variance limit.

6. The electrochemical cell system of claim 5, wherein said electrochemical cell comprises an electrolysis cell.

7. The electrochemical cell system of claim 3, wherein said first operational parameter is indicative of an upper limit set point for gas output pressure, and said processor is adapted to provide a decrease-signal to said energy source in response to said pressure of said gas output exceeding said upper limit set point for gas output pressure.

8. The electrochemical cell system of claim 3, wherein said first operational parameter is indicative of a lower limit set point for gas output pressure, and said processor is adapted to provide an increase-signal to said energy source in response to said pressure of said gas output being is less than said upper limit set point for gas output pressure.

9. The electrochemical cell system of claim 3, wherein said first operational parameter is indicative of an expected increase in gas output pressure over a period of time, said processor is adapted to monitor said first signal over said period of time to determine a change in said gas output pressure, and said processor is adapted to provide an interrupt signal to said energy source in response to said change in said gas output pressure being less than said expected increase.

10. The electrochemical cell system of claim 3, wherein said first operational parameter is indicative of an expected increase in gas output pressure over a period of time, said processor is adapted to monitor said first signal over said period of time to determine a change in said gas output pressure, and said processor is adapted to provide a signal to an alarm in response to said change in said gas output pressure being less than said expected increase.

11. The electrochemical cell system of claim 9 wherein said processor is adapted to determine said first operational parameter based on said quantity of energy to said electrochemical cell.

12. The electrochemical cell system of claim 11 wherein said processor is adapted to receive a second signal indicative of said quantity of energy in response to feedback from said energy source.

13. A method for controlling a gas output from an electrochemical call electrically connected to an electrical source, the method comprising:
sensing a parameter of said gas output and creating a first signal indicative of said parameter;
retrieving a predetermined value and a predetermined variance from a memory device;
comparing said first signal to said predetermined value;
providing a third signal to said electrical source in response to said first signal differing from said predetermined value by an amount greater than said predetermined variance;
adjusting an output of said electrical source in response to said third signal;
adjusting at least one of said predetermined value and said predetermined variance based on feedback from said electrical source; and
providing said predetermined value and said predetermined variance to said memory device from a remote computer.

14. A method for controlling a gas output from an electrochemical cell electrically connected to an electrical source, the method comprising:
sensing a parameter of said gas output and creating a first signal indicative of said parameter;
retrieving a predetermined value and a predetermined variance from a memory device;
comparing said first signal to said predetermined value;
providing a third signal to said electrical source in response to said first signal differing from said predetermined value by an amount greater than said predetermined variance;
adjusting an output of said electrical source in response to said third signal; and
adjusting at least one of said predetermined value and said predetermined variance based on feedback from said electrical source.

15. The method of claim 14, wherein said parameter is a pressure of said gas output, and said predetermined value is indicative of a predetermined pressure.

16. A method of controlling a gas output from an electrochemical cell electrically connected to an electrical source, the method comprising:
sensing a parameter of said gas output and creating a first signal indicative of said parameter;
retrieving a predetermined upper-value from a memory device;
comparing said first signal to said predetermined upper-value;
providing a lower-signal to said electrical source in response to said first signal being greater than said predetermined upper-value;

lowering a output of said electrical source in response to said lower-signal;

retrieving a predetermined lower-value from a memory device;

comparing said first signal to said predetermined lower-value;

providing an increase-signal to said electrical source in response to said first signal being is less than said predetermined lower-value; and increasing an output of said electrical source in response to said increase-signal; and adjusting at least one of said predetermined upper-value and said predetermined lower-value based on feedback from said electrical source.

17. The method of claim 16, wherein said parameter is a pressure of said gas output, said predetermined upper-value is indicative of an upper limit set point for gas output pressure, and said predetermined lower-value is indicative of a lower limit set point for gas output pressure.

18. A method of controlling a gas output from an electrochemical cell electrically connected to an electrical source, the method comprising:

sensing a parameter of said gas output and creating a first signal indicative of said parameter;

retrieving a predetermined value from a memory device, said predetermined value indicative of an expected increase in said parameter over a period of time;

monitoring said first signal over said period of time to determine an increase in said parameter;

providing a signal to one or more of an alarm and said electrical source in response to said increase in said parameter being is less than said expected increase in said parameter; and adjusting said predetermined value based on feedback from said electrical source.

19. The method of claim 18, further comprising:

interrupting an output of said electrical source in response to said signal.

20. The method of claim 18, further comprising:

activating an alarm in response to said signal.

21. The method of claim 18, wherein said parameter is a pressure of said gas output.

22. A method of controlling a gas output from an electrochemical cell electrically connected to an electrical source; the method comprising:

sensing a parameter of said gas output and creating a first signal indicative of said parameter;

retrieving a predetermined value from a memory device, said predetermined value indicative of an expected increase in said parameter over a period of time;

monitoring said first signal over said period of time to determine an increase in said parameter;

providing a signal to one or more of an alarm and said electrical source in response to said increase in said parameter being is less tan said expected increase in said parameter; and determining said predetermined value based on said quantity of energy to said electrochemical cell.

23. An electrochemical cell system comprising:

an electrolysis cell configured to receive electrical energy and to produce hydrogen gas;

an electrical source configured to provide a quantity of electrical energy to said electrolysis cell;

a sensing apparatus in operable communication with a gas output from said electrolysis cell, said sensing apparatus adapted to provide a sensed signal indicative of a pressure of said gas output; and a computer in operable communication with said sensing apparatus and said electrical source, said computer including:

a processor programmed for retrieving a first operational parameter and a predetermined variance from a memory device;

comparing said sensed signal to said first operational parameter;

providing a third signal to said electrical source in response to said sensed signal differing from said first operational parameter by an amount greater than said predetermined variance;

adjusting an output of said electrical source in response to said third signal;

adjusting at least one of said predetermined value and said undetermined variance based on feedback from said electrical source;

wherein said processor and a non-volatile memory device are operably coupled to a remote computer, said remote computer is configured to provide said first operational parameter to said non-volatile memory device.

24. The electrochemical cell system of claim 23, wherein:

said first operational parameter is indicative of in expected increase in gas output pressure over a period of time, said processor is adapted to monitor said sensed signal over said period of time to determine a change in said gas output pressure, and said processor is adapted to provide an interrupt signal to said energy source in response to said change in said gas output pressure being less than said expected increase.

25. The electrochemical cell system of claim 24 wherein said processor is adapted to determine said first operational parameter based on said quantity of energy to said electrochemical cell.

26. The electrochemical cell system of claim 25 wherein said processor is adapted to receive a signal indicative of said quantity of energy in response to feedback from said energy source.

* * * * *